United States Patent [19]

Bell, III

[11] Patent Number: 4,825,645
[45] Date of Patent: May 2, 1989

[54] POWER TURBINE AND REDUCTION GEAR ASSEMBLY

[75] Inventor: Albert H. Bell, III, Birmingham, Mich.

[73] Assignee: General Motors Corporation, Detroit, Mich.

[21] Appl. No.: 95,006

[22] Filed: Sep. 8, 1987

[51] Int. Cl.$^4$ ............................................. F02C 3/10
[52] U.S. Cl. ................................ 60/39.161; 415/122.1; 416/170 R; 74/DIG. 5; 403/259
[58] Field of Search ............... 60/39.161; 74/DIG. 5, 74/421 R; 403/259, 334, 345; 416/170 R, 170 B; 415/122 R

[56] References Cited

U.S. PATENT DOCUMENTS

| | | | |
|---|---|---|---|
| 2,969,644 | 1/1961 | Williams et al. | 60/39.161 |
| 3,271,949 | 9/1966 | Jones et al. | 60/39.161 |
| 3,313,150 | 4/1967 | Hulbert | 73/862.31 |
| 4,118,927 | 10/1978 | Kronogard | 60/39.161 |
| 4,629,354 | 12/1986 | Freese | 403/259 |
| 4,721,009 | 1/1988 | Berle et al. | 403/259 |

FOREIGN PATENT DOCUMENTS

| | | | |
|---|---|---|---|
| 1286846 | 1/1987 | U.S.S.R. | 403/259 |
| 1496020 | 12/1977 | United Kingdom | 403/259 |

*Primary Examiner*—Donald E. Stout
*Attorney, Agent, or Firm*—Saul Schwartz

[57] ABSTRACT

A power turbine and first stage gear reduction assembly for a gas coupled gas turbine engine includes a first stage reduction gear, a tubular pinion shaft carrying a first stage pinion gear, and a power turbine shaft having a power turbine at a turbine end thereof. The first stage pinion gear and the first stage reduction gear are straddle mounted on an engine block of the gas turbine engine for rotation about parallel primary and secondary axes of the engine, respectively, and in meshing engagement. The power turbine shaft is aligned on the primary axis with a power transfer end thereof within and connected to the pinion shaft through a self-holding taper connection so that the power transfer end of the pinion shaft is supported on the engine block for rotation about the primary axis. A third bearing is disposed between the engine block and the power turbine shaft adjacent the power turbine whereby the power transfer end of the power turbine shaft is supported on the engine block for rotation about the primary axis.

4 Claims, 2 Drawing Sheets

POWER TURBINE AND REDUCTION GEAR ASSEMBLY

BACKGROUND OF THE INVENTION

1. Field of the Invention

This invention relates generally to gas coupled gas turbine engines and, more particularly, to a mounting system for the power turbine shaft and first stage reduction gear set in such engines.

2. Description of the Prior Art

In typical gas coupled gas turbine engines, a power turbine is supported on an engine block of the engine for rotation about a primary axis of the block independently of the gasifier shaft of the engine. The gasifier produces a continuous stream of hot gas motive fluid which is directed by a power turbine nozzle against an array of blades on the power turbine whereby a power turbine shaft is rotated at high speeds of on the order of 100,000 RPM in some small engines. Torque is transferred from the power turbine shaft to an output shaft of the engine by one or more reduction gear sets including a first stage pinion gear rotatable as a unit with the power turbine shaft and a first stage reduction gear rotatably supported on the engine block. Typically, the first stage pinion gear is rigidly connected directly to the power turbine shaft which is supported on the gine block through either a two or three bearing mounting system. In two bearing mounting systems, the power turbine shaft is supported on the engine block by bearings at each end of the shaft, the first stage pinion gear being rigidly mounted on the shaft near one of the bearings. While such systems adequately support the power turbine shaft, the softness of at least one of the bearing mounts necessary to control shaft vibrations renders it difficult to achieve and maintain the highly accurate mesh between the first stage pinion gear and the first stage reduction gear which is required for durability where the pinion gear rotates at on the order of 100,000 RPM. In three bearing mounting systems, a third bearing between the engine block and the power turbine shaft cooperates with the one of the power turbine shaft bearings nearest the first stage pinion in more rigidly and accurately straddle mounting the pinion gear on the engine block. The third bearing, however, renders it more difficult to mount the power turbine shaft on the engine block and also may render it more difficult to achieve adequate vibration damping. A power turbine shaft and first stage reduction gear assembly according to this invention incorporates, in one system, advantages of both the two and the three bearing mounting systems.

SUMMARY OF THE INVENTION

This invention is a new and improved power turbine and first stage reduction gear assembly for a gas coupled gas turbine engine of the type including an engine block defining a primary axis and a secondary axis and a gasifier producing a continuous stream of hot gas motive fluid. The new and improved power turbine and first stage reduction gear assembly includes a first stage reduction gear on the engine block rotatable about the secondary axis, a tubular pinion shaft with a first stage pinion gear thereon, a pair of anti-friction bearings between the engine block and the pinion shaft straddle mounting the first stage pinion gear on the gine block for rotation about the main axis of the engine and in mesh with the first stage reduction gear, a power turbine shaft aligned on the primary axis with one end disposed within the pinion shaft and with a power turbine at the other end, a third bearing between the engine block and the power turbine shaft engaging the latter near the power turbine, and a tapered shoulder on the power turbine shaft received in a tapered bore in the pinion shaft defining a self-holding connection between the two shafts. The straddle mounting of the first stage pinion gear provides the accuracy and rigidity for a durable high-speed gear mesh between the first stage pinion gear and the first stage reduction gear. The self-holding taper connection provides a mounting on the engine block for the end of the power turbine shaft remote from the power turbine which mounting cooperates with the third bearing in supporting the power turbine shaft on the engine block generally at its opposite ends. The attachment of the third bearing to the engine block can be made soft for vibration control without compromising the rigidity of the mounting for the first stage pinion gear. In a preferred embodiment of the new and improved power turbine and first stage reduction gear assembly, the first stage pinion gear is formed integrally with the pinion shaft, the tapered shoulder on the power turbine shaft is drawn into the tapered bore on the pinion shaft by a threaded fastener on a stem portion of the power turbine shaft, and the third bearing between and the engine block and the turbine shaft is a full floating bearing for vibration control.

DESCRIPTION OF A PREFERRED EMBODIMENT

Figure 1:
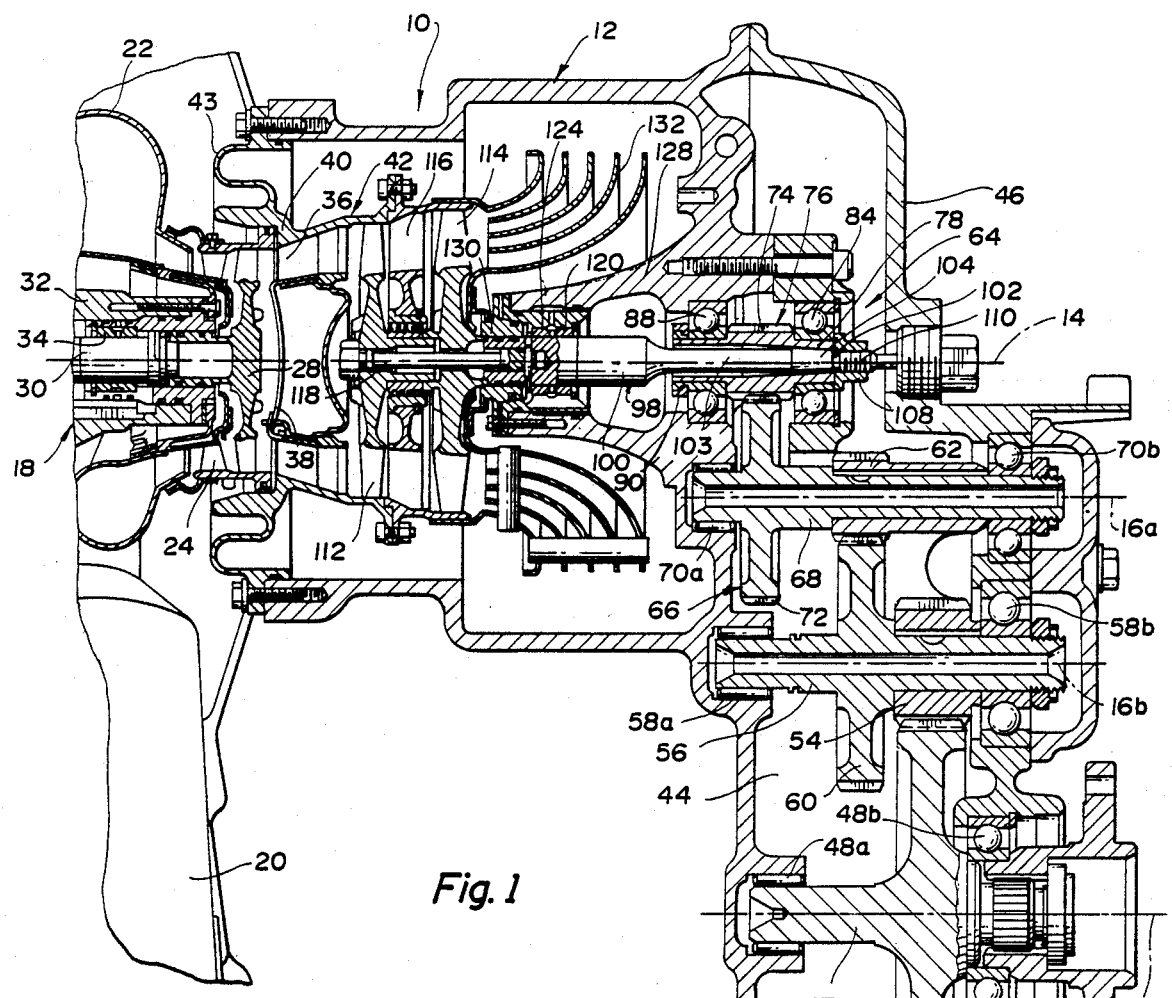
FIG. 1 is a fragmentary sectional view of a gas coupled gas turbine engine having a power turbine and first stage reduction gear assembly according to this invention taken generally along the primary axis of the engine.

Referring now to the drawings, a gas coupled gas turbine engine 10 is partially illustrated in FIG. 1 and described herein only as necessary to establish the environment of the power turbine and first stage gear reduction assembly according to this invention. The gas turbine engine 10 includes an engine block 12 which defines a primary axis 14 and a plurality of secondary axes 16a, 16b and 16c each parallel to the primary axis 14 and laterally displaced from the same and from each other. The engine 10 has a gas generator or gasifier 18 which includes a partially illustrated combustor can 20, a partially illustrated scroll chamber 22, an annular gasifier nozzle 24, and a gasifier turbine 28 rigidly attached to one end of a gasifier turbine shaft 30. A gasifier compressor, not shown, is rigidly attached to the other end of the gasifier turbine shaft 30. The gasifier turbine shaft 30 is supported on a generally cylindrical extension 32 of the engine block 12 by a sleeve bearing assembly 34 for rotation about the primary axis 14. Hot gas motive fluid generated in the combustor can 20 is delivered to the scroll chamber 22 and exits from the same through the gasifier nozzle 24 which directs the motive fluid downstream against the blades on the gasifier turbine 28 whereby the gasifier turbine shaft is rotated to drive the compressor. Hot gas motive fluid exiting from the gasifier turbine 28 proceeds downstream in an annular flow path 36 defined between an inner baffle 38 and a shroud portion 40 of an annular power turbine nozzle 42 rigidly attached to the engine block 12 through a web 43 around the shroud portion 40.

With continued reference to FIG. 1, a gear compartment 44 having a lubricant sump 45 at the bottom thereof is defined between the engine block 12 and a cover 46 rigidly attached thereto. The cover 46 represents an extension of the engine block and the description herein treats the two as a single unit. An output shaft 47 is supported on the engine block 12 for rotation about the secondary axis 16c by a pair of anti-friction bearings 48a and 48b. A drive flange 50 is rigidly attached to the output shaft 47 outside the cover 46 and provides a convenient location for attachment of a power transmission device, not shown. An integral third stage reduction gear 52 on the output shaft 47 between the bearings 48a and 48b meshes with a third stage pinion gear 54. The third stage pinion gear is rigidly mounted on an intermediate shaft 56 aligned on the secondary axis 16b between a pair of antifriction bearings 58a and 58b. The bearings 58a and 58b support the intermediate shaft on the engine block 12 for rotation about the secondary axis 16b. An integral second stage reduction gear 60 on the intermediate shaft 56 is disposed between the bearings 58a and 58b and meshes with a second stage pinion gear 62. Energy is extracted from the hot gas motive fluid issuing from the power turbine nozzle 42 and delivered to the second stage pinion gear 62 by a power turbine and first stage reduction gear assembly 64 according to this invention.

Figure 3:
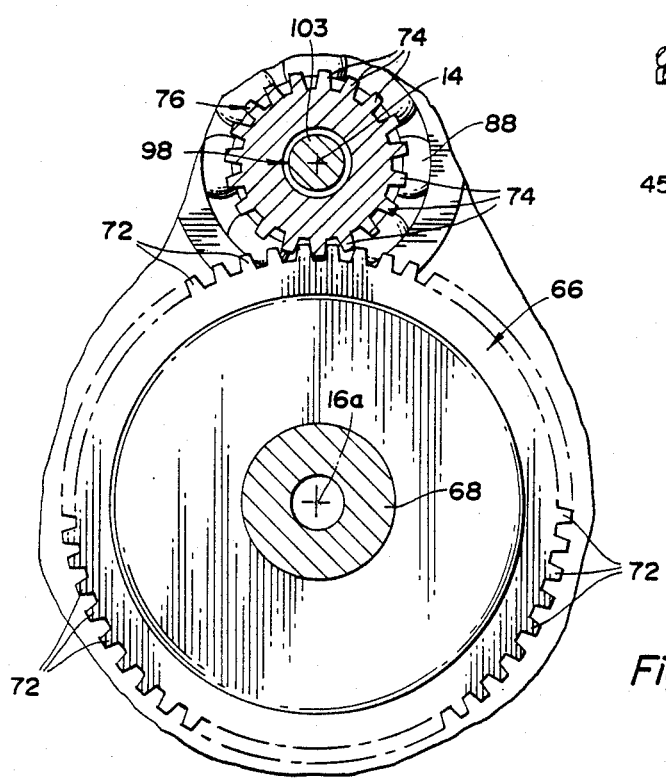
FIG. 3 is a sectional view taken generally along the plane indicated by lines 3—3 in FIG. 2.
Figure 2:
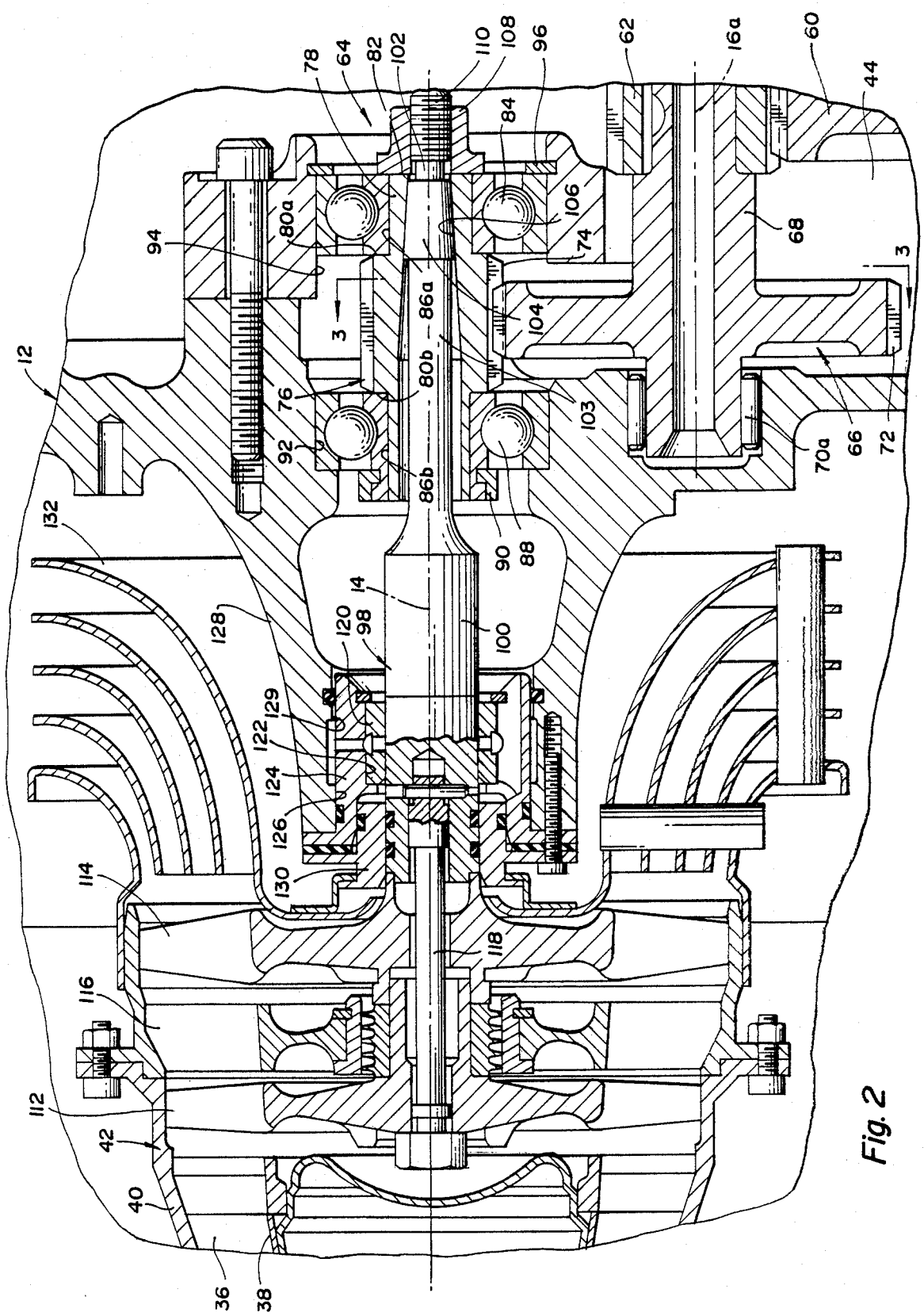
FIG. 2 is an enlarged view of a portion of FIG. 1 showing more distinctly the power turbine and first stage reduction gear assembly according to this invention.

The power turbine and first stage reduction gear assembly 64 includes a first stage reduction gear 66 formed integrally with a shaft portion 68 aligned on the secondary axis 16a of the engine block. The second stage pinion gear 62 is rigidly attached to the shaft portion 68 of the first stage reduction gear and both are disposed between a pair of antifriction bearings 70a and 70b which support the shaft portion 68 on the engine block 12 for rotation about the secondary axis 16a. The first stage reduction gear 66 has a circumferential array of gear teeth 72, FIG. 3, which mesh with a circumferential array of gear teeth 74 on the first stage pinion gear 76. The first stage pinion gear is formed integrally with a tubular pinion shaft 78 aligned on the primary axis 14 of the engine block as a large diameter or increased wall thickness portion of the shaft. The first stage pinion gear 76 is bounded on opposite sides by a pair of annular shoulders 80a and 80b of the pinion shaft disposed in planes perpendicular to the primary axis 14. In addition, the right or outboard end of the pinion shaft 78, FIG. 2, terminates in an annular end face 82 disposed in a plane perpendicular to the primary axis 14.

The inner race of a first anti-friction ball bearing 84 is disposed on an outer cylindrical wall 86a of the pinion shaft 78 and abuts the annular shoulder 80a on the latter. Similarly, the inner race of a second anti-friction ball bearing 88 is disposed on an outer cylindrical wall 86b of the pinion shaft 78 and abuts the annular shoulder 80b on the latter. A retainer 90 on the end of the pinion shaft 78 clamps the inner race of the bearing 88 against the annular shoulder 80b. The outer race of the bearing 88 is closely received in and bottoms against an inner shoulder of a counterbore 92 in the engine block 12 centered on the main axis 14 whereby the left or inboard end of the pinion shaft 78 is supported on the engine block through a hard of stiff mounting for rotation about the primary axis. The outer race of the ball bearing 84 is closely received in a bore 94 in the portion of the cover 46 aligned on the primary axis 14 and is retained in the bore by a retaining ring 96 whereby the right or outboard end of the pinion shaft 78 is also supported on the engine block through a hard or stiff mounting for rotation about the primary axis 14. The ball bearings 84 and 88 being in close proximity to and on opposite sides of the first stage pinion gear 76 cooperate in straddle mounting the first stage pinion gear on the engine block 12 for rotation about the primary axis 14.

The power turbine and reduction gear assembly 64 further includes a power turbine shaft 98 having a large diameter cylindrical turbine end 100, a smaller diameter power transfer end 102 and a shank portion 103 providing a transition from the large diameter to the small diameter. The power turbine shaft 98, near the power transfer end 102 thereof, is connectd to the pinion shaft 78 for rotation as a unit therewith by a self-holding machine taper connection including a frustoconical shoulder 104 on the shank portion 103 of the turbine shaft tightly received in a correspondingly frustoconically shaped internal surface 106 in the tubular pinion shaft 78. A nut 108 threaded on a stem portion 110 of the power turbine shaft 98 outboard of the shoulder 104 pulls the shoulder into frictional engagement on the internal surface 106 with sufficient force to establish a self-holding machine taper connection through which all torque is transferred from the power turbine shaft to the pinion shaft. In addition, the nut 108 clamps the inner race of the ball bearing 84 against the shoulder 80a on the pinion shaft. Accordingly, the power transfer end 102 of the power turbine shaft 98 is supported on the engine block 12 for rotation about the primary axis 14.

The power turbine and first stage reduction gear assembly 64 further includes a first stage power turbine 112 and a second stage power turbine 114 disposed on opposite sides of an annular array of stator vanes 116 rigidly attached to the shroud portion 40 of the power turbine nozzle 42. The second stage power turbine abuts the left or inboard end of the power turbine shaft 98 and an elongated cylindrical hub of the first stage power turbine 112 abuts the left side of the first stage power turbine. A bolt 118 is aligned on the primary axis 14 and extends through the first and second stage power turbines 112 and 114 and into a threaded bore in the inboard end of the power turbine shaft 98 whereby the first and second stage power turbines are rigidly clamped to the power turbine shaft for rotation as a unit therewith.

A full floating sleeve bearing 120 is loosely received around the turbine end 100 of the power turbine shaft 98 and is, in turn, loosely and rotatably received within a bore 122 in a bearing support 124. The bearing support 124 is nonrotatably recieved in a cylindrical bore 126 in a leftward extending cone-shaped web 128 of the engine block. The full floating bearing 120 is free to rotate relative to both the turbine shaft 98 and the bearing support 124. Lubricant is supplied under pressure to the annular clearances between the full floating bearing and each of the turbine shaft and the bearing support. A retaining and seal member 130 surrounds the turbine end 100 of the power turbine shaft 98 and is bolted to the web 128 of the engine block. The turbine end 100 of the power turbine shaft 98 is thus supported on the engine block 12 for rotation about the primary axis 14 through a relatively soft bearing assembly including the full floating bearing 120 and the bearing support 124.

In operation, hot gas motive fluid exiting from the power turbine nozzle 42 expands through the blades on the first and second stage power turbines 112 and 114 and then exits through an exhaust diffuser 132. Energy extracted from the hot gas motive fluid by the power turbines rotates the power turbine shaft 98 at a high speed of on the order of 100,000 rpm. Shaft vibrations of the power turbine shaft 98 cause the full floating bearing 120 to rotate within the bore 122. The lubricant film around the full floating bearing develops forces which control shaft vibration. Concurrently, the pinion shaft 78 rotates as a unit with the power turbine shaft causing the first stage pinion gear 76 to rotate the first stage reduction gear 66 at a speed determined by the gear ratio between the first stage pinion and reduction gears. Additional speed reduction and torque multiplication is effected through the second and third gear reduction stages defined by the second and third stage pinion and reduction gears.

The stiff mounting of the ball bearings 84 and 88 on the engine block 12 represents an important feature of this invention because such mounting allows very close control of the lateral spacing between the pinion shaft 78 and the shaft portion 68 of the first stage reduction gear 66 through accurate machining of those features of the engine block 12 which receive the bearings. The relatively simple machining operations through which this relationship is established and maintained means that an optimum mesh between the first stage pinion and reduction gears 76 and 66 can be economically and repeatedly achieved on a production basis.

The self-holding taper connection between the pinion shaft 78 and the power turbine shaft 98 also represents an important feature of this invention. First, the self-holding taper is a relatively simple structure from a manufacturing standpoint which still provides a connection through which all torque is transferred from the power turbine shaft to the pinion shaft without problems, such as fretting, sometimes associated with spline-type connections. Second, because the self-holding taper connection establishes a rigid relationship between the power transfer end 102 of the power trubine shaft and the pinion shaft 78, the power transfer end of the power turbine shaft 98 is, in effect, supported on the engine block 12 by the bearings 84 and 88 for rotation about the primary axis 14. Because the bearings 84 and 88 provide a relatively stiff and accurate location of the ppinion shaft 78 relative to the primary axis 14, the power transfer end of the power turbine shaft is likewise relatively stiffly and accurately located relative to the primary axis. At the turbine end 100 of the power turbine shaft 98, the full floating bearing 120 has a relative soft mounting on the engine block with damping capability. when the power turbine shaft vibrates during operation, the film damping at the full floating bearing controls the vibrations. The shank portion 103 of the power turbine shaft is sufficiently flexible near the furstoconical shoulder 104 to accommodate the excursions of the turbine end 100.

The embodiments of the invention in which an exclusive property or priviledge is claimed are defined as follows:

1. In a gas coupled gas turbine engine of the type including
   an engine block defining a primary axis and a secondary axis parallel to said primary axis,
   a gasifier having a gasifier turbine shaft supported on said engine block for rotation about said primary axis and producing a continuous stream of hot gas motive fluid in an annular flow path centered on said primary axis, and
   an annular power turbine nozzle on said engine block operative to direct said stream of hot gas motive fluid in a downstream direction,
   a power turbine and first stage reduction gear assembly comprising:
   a first stage reduction gear,
   means mounting said first stage reduction gear on said engine block for rotation about said secondary axis,
   a tubular pinion shaft aligned on said primary axis,
   means defining a first stage pinion gear on an outside surface of said pinion shaft rotatable as a unit with said pinion shaft,
   a pair of anti-friction bearings disposed between said engine block and said pinion shaft on opposite sides of said first stage pinion gear whereby said first stage pinion gear is straddle mounted on said engine block for rotation about said primary axis in meshing engagement with said first stage reduction gear,
   a power turbine shaft aligned on said primary axis with a power transfer end disposed within said tubular pinion shaft and with a turbine end disposed adjacent said nozzle,
   means ons aid pinion shaft and on said power turbine shaft at said power transfer end thereof defining a self-holding machine taper connection therebetween whereby torque is transferred between and said power turbine shaft and said pinion shaft and whereby said power transfer end of said power turbine shaft is supported on said engine block for rotation about said primary axis,
   a power turbine rigidly attached to said power turbine shaft at said turbine end thereof and including a circumferential array of turbine blades aligned with said nozzle whereby said blades intercept said hot gas stream from said nozzle for rotating said power turbine shaft, and
   a third anti-friction bearing between said engine block and said power turbine shaft engaging said power turbine shaft adjacent said power turbine whereby said turbine end of said power turbine shaft is supported on said engine block for rotation about said primary axis.

2. The power turbine and first stage reduction gear assembly recited in claim 1 wherein said means defining a first stage pinion gear on an outside surface of said pinion shaft includes
   means on said pinion shaft defining an integral enlarged annular wall portion of said pinion shaft having an outside cylindrical wall, and
   means on said pinion shaft defining a plurality of pinion gear teeth in said outside cylindrical wall in meshing engagement with said first stage reduction gear.

3. The power turbine and first stage reduction gear assembly recited in claim 2 wherein said means on said pinion shaft and on said power turbine shaft at said power transfer end thereof defining a self-holding machine taper connection therebetween includes means on said pinion shaft defining an internal frustoconical surface centered on said primary axis and terminating at an annular end shoulder of said pinion shaft in a plane perpendicular to said primary axis, means on said power turbine shaft defining an external frustoconical shoulder and an externally threaded stem portion adjacent and axially outboard of said shoulder, said shoulder being recived within said internal frustoconical surface with said stem portion projecting axially outboard the plane of said annular end shoulder, and a fastener means received on said threaded stem portion threaded against said annular shoulder to draw said frustoconical shoulder against said internal frustoconical surface with sufficient axial force to establish a frictionally self-holding taper connection between said power turbine shaft and said pinion shaft through which all torque is transferred from said power turbine shaft to said pinion shaft.

4. The power turbine and first stage reduction gear assembly recited in claim 3 wherein said third bearing between said engine block and said power turbine shaft is a full floating sleeve bearing.

* * * * *